(12) United States Patent
Pirchheim et al.

(10) Patent No.: US 9,390,344 B2
(45) Date of Patent: Jul. 12, 2016

(54) SENSOR-BASED CAMERA MOTION DETECTION FOR UNCONSTRAINED SLAM

(71) Applicant: QUALCOMM Incorporated, San Diego, CA (US)

(72) Inventors: Christian Pirchheim, Graz (AT); Clemens Arth, Judendorf-Straßengel (AT); Dieter Schmalstieg, Graz (AT)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/645,675

(22) Filed: Mar. 12, 2015

(65) Prior Publication Data

US 2015/0262029 A1    Sep. 17, 2015

Related U.S. Application Data

(60) Provisional application No. 61/953,122, filed on Mar. 14, 2014.

(51) Int. Cl.
| | | |
|---|---|---|
| *G06K 9/00* | (2006.01) | |
| *G06K 9/52* | (2006.01) | |
| *G06T 3/00* | (2006.01) | |
| *G06T 7/20* | (2006.01) | |
| *G06T 17/00* | (2006.01) | |
| *G06T 7/00* | (2006.01) | |

(52) U.S. Cl.
CPC .............. *G06K 9/52* (2013.01); *G06K 9/00624* (2013.01); *G06T 3/00* (2013.01); *G06T 7/004* (2013.01); *G06T 7/20* (2013.01); *G06T 17/00* (2013.01); *G06T 2207/10016* (2013.01); *G06T 2207/30244* (2013.01)

(58) Field of Classification Search
CPC ...... G06K 9/00624; G06K 9/52; G06T 17/00; G06T 3/00; G06T 7/004; G06T 7/20; G06T 2207/10016; G06T 2207/30244
See application file for complete search history.

(56) References Cited

U.S. PATENT DOCUMENTS

2011/0285810 A1* 11/2011 Wagner .............. H04N 5/23238
                                                    348/36
2012/0033046 A1*  2/2012 Ozaki ................ H04N 13/0409
                                                    348/46

(Continued)

FOREIGN PATENT DOCUMENTS

WO    WO-2010114376 A1    10/2010

OTHER PUBLICATIONS

Christian et al ("Handling Pure Camera Rotation in Keyframe-Bases SLAM", IEEE International Symposium on Mixed and Augmented Reality 2013, Science and Technology Proceedings, Oct. 1-4, 2013, Adelaide, SA, Australia, 2013 IEEE).*

(Continued)

*Primary Examiner* — Amara Abdi
(74) *Attorney, Agent, or Firm* — Kilpatrick Townsend & Stockton LLP

(57) ABSTRACT

Techniques are presented for monocular visual simultaneous localization and mapping (SLAM) based on detecting a translational motion in the movement of the camera using at least one motion sensor, while the camera is performing panoramic SLAM, and initializing a three dimensional map for tracking of finite features. Motion sensors may include one or more sensors, including inertial (gyroscope, accelerometer), magnetic (compass), vision (camera) or any other sensors built into mobile devices.

27 Claims, 10 Drawing Sheets

(56) References Cited

U.S. PATENT DOCUMENTS

| | | | | |
|---|---|---|---|---|
| 2012/0121161 | A1* | 5/2012 | Eade | G09B 29/007 382/153 |
| 2012/0300020 | A1* | 11/2012 | Arth | G06T 7/0046 348/36 |
| 2014/0320593 | A1 | 10/2014 | Pirchheim et al. | |

OTHER PUBLICATIONS

Steffen et al (Live Tracking and Mapping from Both General and Rotation-Only Camera Motion, 2012 IEEE, pp. 13-22).*

Teresa et al (Active Control for Single Camera SLAM, 2006 IEEE, pp. 1930-1936).*

International Search Report and Written Opinion—PCT/US2015/020320—ISA/EPO—Jun. 12, 2015.

Benhimane, Selim et al., "Real-time image-based tracking of planes using efficient second-order minimization", Proceedings of 2004 IEEE/RSJ International Conference on Intelligent Robots and Systems, vol. 1, Sep. 28, 2004, pp. 943-948.

Pircheim, Christian et al., "Handling Pure Camera Rotation in Keyframe-Based SLAM", 2013 IEEE International Symposium on Mixed and Augmented Reality Science and Technology Proceedings, Oct. 1, 2013, pp. 229-238.

Civera, Javier et al., "Drift-Free Real-Time Sequential Mosaicking," Int. J. Comput. Vision, 81 (2): 128-137, Feb. 2009.

Civera, Javier et al., "Interacting Multiple Model Monocular SLAM," IEEE International Conference on Robotics and Automation, May 19-23, 2008, pp. 3704-3709.

Civera, Javier et al., "Inverse Depth Parametrization for Monocular SLAM," IEEE Transactions on Robotics, Oct. 2008, vol. 24, No. 5, pp. 932-945.

Davison, Andrew J. et al., "MonoSLAM: Real-Time Single Camera SLAM," IEEE Transactions on Pattern Analysis and Machine Intelligence, vol. 29, No. 6, Jun. 2007, pp. 1052-1067.

Davison, Andrew J., "Real-time Simultaneous Localisation and Mapping with a Single Camera" Proceedings of the Ninth IEEE International Conference on Computer Vision (ICCV'03), IEEE Computer Society, 2003, vol. 2, pp. 8.

Eade, Ethan et al., "Scalable Monocular SLAM," Proceedings of the 2006 IEEE Computer Society on Computer Vision and Pattern Recognition, (CVPR'06) 8 pgs., IEEE Computer Society 2006.

Engels, Chris et al., "Bundle Adjustment Rules," Photogrammetric Computer Vision, 2006, 6 pages, accessed Sep. 25, 2014 at http://citeseerx.ist.psu.edu/viewdoc/summary?doi=10.1.1.126.6901.

Frese, Udo, "Efficient 6-DOF SLAM with Treemap as a Generic Backend," IEEE International Conference on Robotics and Automation, 2007, pp. 4814-4819.

Gauglitz, Steffen et al., "Live Tracking and Mapping from Both General and Rotation-Only Camera Motion," 2012 IEEE International Symposium on Mixed and Augmented Reality (ISMAR), 2012, 10 pages.

Hartley, Richard et al., "4.7 Robust estimation," Multiple View Geometry in Computer Vision, Cambridge University Press, second edition, 2004, 18 pgs.

Kim, Hyejin et al., "IMAF: in situ indoor modeling and annotation framework on mobile phones," Pers Ubiquit Comput, Publisher Springer-Verlag, Apr. 7, 2012, 12 pages.

Klein, Georg et al., "Improving the Agility of Keyframe-Based SLAM," Proceedings of the 10th European Conference on Computer Vision: Part II, 14 pages, 2008, accessed Sep. 25, 2014 at http://www.robots.ox.ac.uk/gk/publications/KieinMurray2008ECCV.pdf.

Klein, Georg et al., "Parallel Tracking and Mapping for Small AR Workspaces," IEEE International Symposium on Mixed and Augmented Reality, 2007, pp. 225-234.

Klein, Georg et al., "Parallel Tracking and Mapping on a Camera Phones", IEEE International Symposium on Mixed and Augmented Reality,Oct. 19-22, 2009, pp. 83-86.

Lovegrove, Steven et al., "Real-Time Spherical Mosaicing Using Whole Image Alignment", Sep. 5, 2010, Computer Vison A ECCV 2010, Springer Berlin Heidelberg, Berlin, Heidelberg, 14 pages.

Montiel, J.M.M., et al., "Unified Inverse Depth Parametrization for Monocular SLAM," Robotics: Science and Systems, 2006, 8 pgs, accessed Sep. 25, 2014 at www.roboticsproceedings.org/rss02/p11.pdf.

Newcombe, Richard A., et al., "DTAM: Dense Tracking and Mapping in Real-Time," 2011 IEEE International Conference on Computer Vission (ICCV), 2011, pp. 2320-2327.

Pirchheim, Christian et al., "Homography-Based Planar Mapping and Tracking for Mobile Phones," IEEE International Symposium on Mixed and Augmented Reality Science and Technology Proceedings, Oct. 26-29, 2011, pp. 27-36.

Strasdat, Hauke et al., "Real-time Monocular SLAM: Why Filter?" 2010 IEEE International Conference on Robotics and Automation, May 3-8, 2010, pp. 2657-2664.

Torr, P.H.S., "Bayesian Model Estimation and Selection for Epipolar Geometry and Generic Manifold Fitting," Int. J. Comput. Vision, Apr. 2002, 27 pages.

Wagner, Daniel et al., "Real-time Panoramic Mapping and Tracking on Mobile Phones," IEEE Virtual Reality Conference, Mar. 20, 2010, pp. 211-218.

Wagner, Daniel et al., "Real-Time Detection and Tracking for Augmented Reality on Mobile Phones", IEEE Transactions on Visualization and Computer Graphics, vol. 16, No. 3, May 2010, pp. 355-368.

* cited by examiner

SENSOR-BASED CAMERA MOTION DETECTION FOR UNCONSTRAINED SLAM

CROSS-REFERENCE TO RELATED ACTIONS

This application is a Non-Provisional application and claims benefit and priority of U.S. Provisional Application No. 61/953,122, filed on Mar. 14, 2014, titled "SENSOR-BASED CAMERA MOTION DETECTION FOR UNCONSTRAINED SLAM," which is herein incorporated by references in its entirety and for all purposes. This application also incorporates by reference in its entirety, U.S. application Ser. No. 14/151,766, filed on Jan. 9, 2014 and titled "MONOCULAR VISUAL SLAM WITH GENERAL AND PANORAMA CAMERA MOVEMENTS."

BACKGROUND

The subject matter disclosed herein relates generally to location detection and specifically to Simultaneous Localization and Mapping (SLAM).

Visual Simultaneous Localization and Mapping (VSLAM) systems can process the input of a single camera coupled to a device and continuously build up a map (aka model) of an environment as the camera moves. Visual SLAM systems simultaneously track the position and orientation (pose) of the device with respect to the map. The visual SLAM system may operate in different modes for tracking the device and building the map based on the movement of the device. For example, while the device is experiencing general motion that includes translational motion, the device may transition to a general motion mode and build the map for general motion. Similarly, when the device is only rotating and not moving from one place to another, the device may switch to rotation-only mode and build a rotation-only map.

Certain aspects of the disclosure discuss techniques for robustly switching from rotation-only mode to general motion mode.

SUMMARY

The subject matter disclosed herein relates generally to camera motion detection and specifically to Simultaneous Localization and Mapping (SLAM).

Aspects of this disclosure provide techniques for robustly detecting transitions between general and rotation-only camera motion and the corresponding panoramic/3D tracking and mapping modes. Incorrect transitions may corrupt both 3D and panorama maps with erroneously measured features and lead to tracking failure. In contrast to existing vision-only methods such as model selection algorithms, aspects of this disclosure may use one or more sensors, including inertial (gyroscope, accelerometer), magnetic (compass), and vision (camera) sensors.

Certain aspects of the disclosure detect transitions from rotation-only mode to general motion mode while the camera is tracked from a panorama map using a 3DOF rotation motion model. While in rotation-only mode, the visual panorama map tracker encodes translational motion as additional virtual rotation in its rotational motion estimates. In parallel, rotation from motion sensors is measured. A parallax angle is derived by computing the difference between vision and motion sensor rotation estimates that can be used in determining translational motion. Reliably determining the parallax angle and consequently the translational motion allows for triggering the initialization of a new 3D map which allows for continuous tracking of the camera in full 6DOF.

Aspects of the disclosure describe an example method, apparatus, non-transitory computer readable medium and means for detecting translational motion while tracking a device in panoramic Simultaneous Localization and Mapping (SLAM) mode that includes determining a vision-based rotational motion angle for the device, wherein the vision-based rotational motion angle is determined by performing image processing on a plurality of keyframes, determining a sensor-based rotational motion angle for the device between the plurality of keyframes, wherein the sensor-based rotational motion angle is determined using one or more motion sensors coupled to the device, determining a parallax angle for the device, wherein the parallax angle is determined by comparing the vision-based rotational motion angle and the sensor-based rotational motion angle, comparing the parallax angle against a threshold value, and detecting the translational motion based upon the parallax angle being above the threshold value. In certain aspects, the motion sensors may include gyroscopes, accelerometers, magnetometers, cameras or any other suitable sensors for detecting motion.

In certain aspects, the non-transitory computer-readable storage medium may include instructions executable by a processor for performing aspects of simultaneous localization and mapping (SLAM) as described herein. Furthermore, the device or apparatus for detecting translational motion while tracking a device in panoramic Simultaneous Localization and Mapping (SLAM) mode may include memory for storing maps and other data structures, one or more cameras coupled to the device/apparatus for obtaining information about the physical scene and one or more processors coupled to the memory and configured to perform aspects of the disclosure described herein.

Aspects of the disclosure further include determining the translational motion using at least the parallax angle between the keyframes in the plurality of keyframes. Certain aspects of the disclosure may also include[s] determining depth information for one or more features with respect to the device by triangulating distance for the one or more features from the device using at least the translational motion. Also, certain aspects of the disclosure further include initializing a three dimensional (3D) map for tracking the device in the general motion mode, at least based on detecting of the translational motion. Certain aspects may include switching to six degrees of freedom (6DOF) SLAM mapping based on detecting translational motion. Certain aspects of the disclosure include [s] initializing a three dimensional (3D) map for tracking the device using stereo initialization of the 3D map using two keyframes, at least based on detecting of the translational motion. In certain aspects of the disclosure, vision-based rotational motion angle and the sensor-based rotational motion angle are detected for a motion between a reference keyframe acquired at a first time and a current keyframe acquired at a second time.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
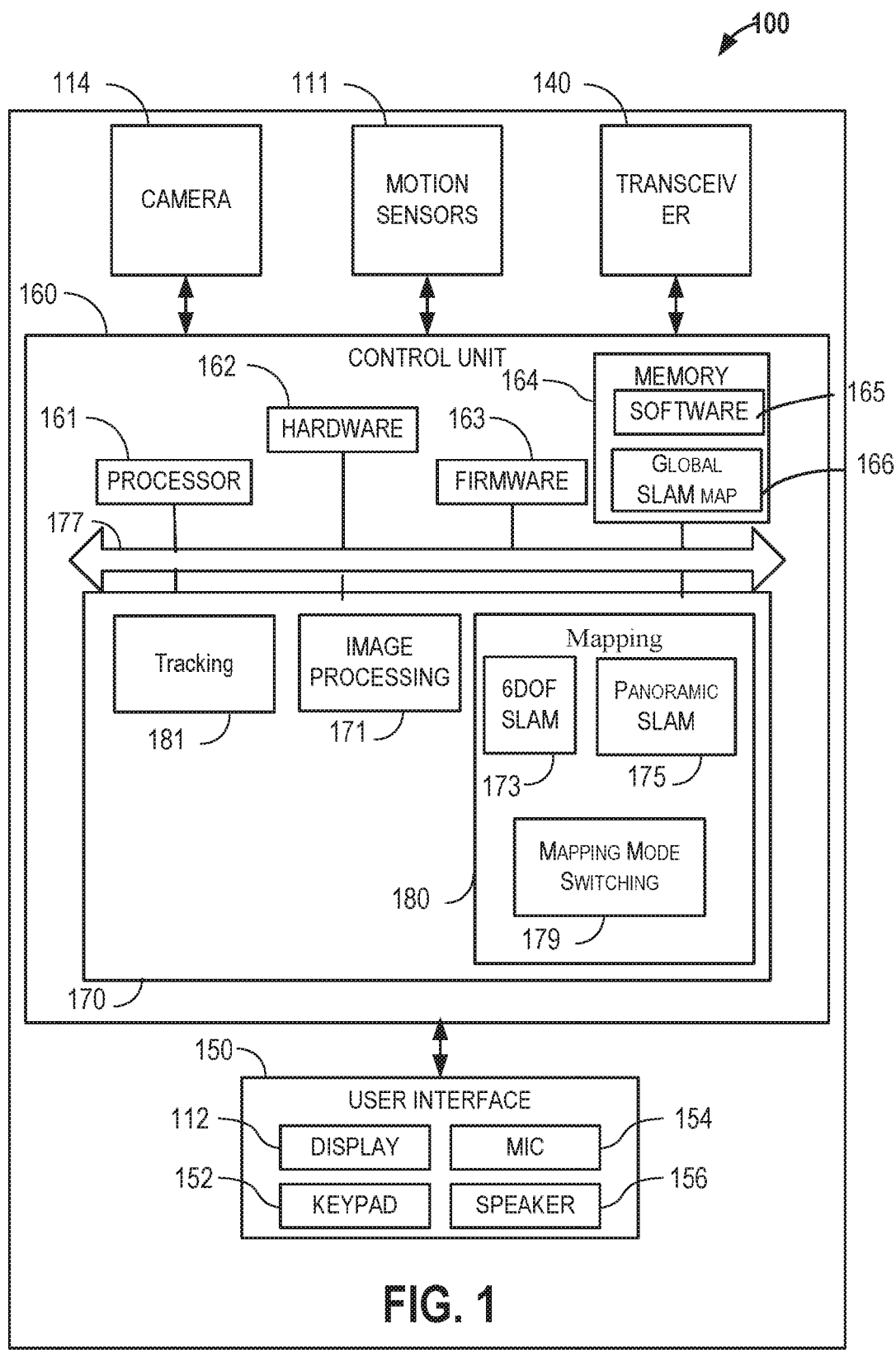
FIG. 1 is a block diagram of a system according to certain aspects of the disclosure.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Aspects of the disclosure, although not limited to, are related to Simultaneous Localization and Mapping (SLAM) systems, such as Visual SLAM (VSLAM) and Airborne Cooperative Visual Simultaneous Localization and Mapping (C-VSLAM). SLAM systems can process the input of a single camera and continuously build up a map (aka model) of an environment as the camera moves. A map of an environment may represent certain aspects of the environment, such as three dimensional (3D) features. Visual SLAM systems may be configured to simultaneously track the position and orientation (pose) of the camera with respect to the map. Certain optimized SLAM systems may decouple tracking from mapping and run these tasks asynchronously. In certain implementations, tracking and mapping functions may be performed using separate processing threads that may be executed in parallel on multi-core processors. Keyframe-based SLAM systems discretely select frames from the incoming camera image stream or video feed and use these frames for mapping (e.g. to extend the map) and tracking. Such discretely selected camera image frames may be referred to as keyframes.

SLAM systems with six degrees of freedom (6DOF) assume general camera motion (motion that includes translation and optional rotation) and apply structure-from-motion techniques to create 3D feature maps. Structure-from-motion techniques may include extracting 3D information about the environment from two-dimensional keyframes. Robust triangulation of 3D map features from observations of multiple camera viewpoints requires sufficient parallax induced by translational or general camera motion. The parallax angle is the angle between the two viewpoints induced by the translational motion of the device between the two viewpoints. As described herein, 6DOF motion and general motion may be used interchangeably without deviating from the scope of the disclosure.

In contrast, panoramic SLAM systems assume rotation-only camera motion and track the camera in three degrees of freedom (3DOF). Because no parallax is observed, feature points are not triangulated and consequently can only be described as rays or features without depth information. As described herein, such ray point features are referred to as infinite features, and 3D point features from 6DOF SLAM that include depth information are called finite features. As described herein, panoramic SLAM may be referred to as 3DOF SLAM and panoramic rotation may be referred to as 3DOF rotation, and may be used interchangeably without deviating from the scope of the disclosure.

Unconstrained SLAM (USLAM) systems handle both general and rotation-only camera motion. Depending on the current camera motion, these SLAM systems apply either structure-from-motion or panoramic tracking and mapping techniques, resulting in a set of 3D and panorama maps. General camera motion is mapped into 3D maps consisting of features with finite depth that allow for tracking the camera in full 6DOF. In contrast, rotation-only camera motion is mapped into panorama maps consisting of features with infinite depth that allow for tracking the camera as 3DOF rotation only. USLAM may also be referred to as Hybrid SLAM (HSLAM) and these terms may be used interchangeably throughout the specification without departing from the scope of the disclosure.

USLAM mapping and tracking allows the user to seamlessly switch between general motion and pure-rotation motion, depending on camera motion performed by the user. In one embodiment, USLAM mapping utilizes 6DOF and panorama keyframes to estimate new parts of a three dimensional (3D) map. Such a map that combines 6DOF and panoramic information may be referred to as a Global SLAM Map. Thus, the Global SLAM map may be described as a container of one or more general motion maps and panorama maps. The Global SLAM map may also be referred to a Hybrid map, and may be used interchangeably with the Global SLAM map without deviating from the scope of the disclosure.

USLAM systems typically aim to merge general motion maps and panorama maps whenever possible into larger maps with a common coordinate system (including a common scale). For example, a USLAM system may merge general motion maps and panorama maps with sufficient overlap between a map pair. In general, the Global SLAM map may typically contain several maps which are unconnected, meaning that the spatial transformations between the individual 3D/panorama maps are unknown (or only partially known).

According to certain aspects of the disclosure, a device while operating in panoramic SLAM mode can experience translational motion. In certain instances, translational motion may be a result of unintentional motion, such as panning, by the user of the device. Traditionally, such translational motion results in error and loss of tracking of features in panoramic SLAM.

Aspects of the disclosure describe techniques for robustly detecting translational motion and transitioning between rotation-only motion mode and general motion mode and the corresponding panoramic/3D tracking and mapping modes. Incorrect transitions may corrupt both 3D and panorama maps with erroneously measured features and lead to tracking failure. In contrast to existing vision-only methods such as model selection algorithms, aspects of the disclosure use one or more sensors, including inertial (gyroscope, accelerometer), magnetic (compass), vision (camera) or any other sensors.

As described in further detail below, in certain aspects, the USLAM system is configured to handle rotations away from the mapped part of the scene (aka transition from 6DOF to panorama mapping). These rotations are detected and special "panorama" (aka 3DOF) keyframes are selected that are used to build up panorama maps that include infinite features. The panorama maps are registered as part of the 3D map. In some instances, the panorama keyframes use the last general motion keyframe as the base to build the panorama maps as the camera rotates away from the mapped part of the scene.

The USLAM system supports transition from a panorama map to another 3D map. The camera translation away from the mapped part of the scene is detected by comparing vision and motion sensor poses, followed by the initialization of a new 3D map (that is inconsistent with other 3D maps), which is added to the Global SLAM map.

In particular, techniques are described for detecting transitions from rotation-only to general motion while the camera is tracked from a panorama map using a 3DOF rotation motion model. The detection of the translational motion that is detected between two camera viewpoints may be performed by comparing the rotational angle acquired using image processing techniques and sensors. The rotational angle detected using image processing, also referred to as vision-based rotational motion angle may include a virtual angle component introduced due to the translational motion. On the other hand, the rotational angle from the sensors, also referred to as sensor-based rotational motion angle, represents the actual (or near actual) rotation of the device between the two camera views. The parallax angle, that is the angle between the two viewpoints introduced by the translational motion, can be calculated by comparing the vision-based rotational motion angle with the sensor-based rotational motion angle. Keyframes may be selected using parallax and coverage heuristics. The parallax angle depends on the baseline of the translational motion and the scene depth and thus can be used to determine translational motion. The determined translational motion between the two views is used to triangulate features commonly observed in the two views, thus determining the depth of the features. The two camera views are selected as 6DOF keyframes and added to a new 3D map together with the triangulated finite features. In turn, the new 3D map is added to the Global SLAM map. Thus, reliably determining the parallax angle allows for the robust initialization of a new 3D map which allows for continuously tracking the camera in full 6DOF.

Techniques described herein enable populating the Global SLAM map with additional 6DOF maps using translational motion detected while operating in panoramic SLAM mode, enhancing the quality of Global SLAM map. Furthermore, techniques may prevent loss of tracking of features, due to translational motion in the panoramic SLAM mode, by appropriately detecting translational motion and continuing the tracking using 6DOF SLAM.

FIG. 1 is a block diagram illustrating a system in which aspects of the disclosure may be practiced. The system may be a device 100, which may include one or more general purpose processors 161, transceiver 140, Image Processing module 171, Tracking module 181, Mapping module 180 that includes 6DOF SLAM module 173, 3DOF SLAM module 175, and Mapping Mode Switching module 179 and a memory 164. The device 100 may also include one or more buses 177 or signal lines coupling the Tracking module 181, Image Processing module 171, and Mapping module 180 (6DOF SLAM module 173, 3DOF SLAM module 175, and Mapping Mode Switching module 179) either directly or indirectly through software interfaces, hardware interfaces or some combination thereof. The modules 170, 171, 173, 175, 179, 180 and 181 are illustrated separately from processor 161 and/or hardware 162 for clarity, but may be combined and/or implemented in (or executed on) the processor 161 and/or hardware 162 based on instructions in the software 165 and the firmware 163. Control unit 160 can be configured to implement methods for performing USLAM as described below. For example, the control unit 160 can be configured to implement functions of the mobile device 100 described in FIGS. 2-10. In certain embodiments the software 165 or firmware 163 instructions may be stored on a non-transitory computer readable medium.

The device 100 may be a mobile device, wireless device, cell phone, augmented reality device (AR), personal digital assistant, wearable device (e.g., eyeglasses, watch, head wear, head mounted device (HMD) or similar bodily attached device), mobile computer, tablet, personal computer, laptop computer, data processing device/system, or any type of device that has processing capabilities.

In one embodiment, the device 100 is a mobile/portable platform. The device 100 can include a means for capturing an image, such as camera 114 and may also include motion sensors 111, such as accelerometers, gyroscopes, electronic compass, or other similar motion sensing elements. Such motion sensors 111 may be used for determining the sensor-based rotational motion angle and consequently the translational motion associated with the device 100.

The device 100 may also capture images on a front or rear-facing camera (e.g., camera 114). The device 100 may further include a user interface 150 that includes a means for displaying an augmented reality image, such as on the display 112. The user interface 150 may also include a virtual or physical keyboard, keypad 152, or other input device through which the user can input information into the device 100. If desired, integrating a virtual keypad into the display 112 with a touch screen/sensor may obviate the keyboard or keypad 152. The user interface 150 may also include a microphone 154 and speaker 156, e.g., if the device 100 is a mobile platform such as a cellular telephone. Device 100 may include other elements unrelated to the present disclosure, such as a satellite position system receiver, power device (e.g., a battery), as well as other components typically associated with portable and non-portable electronic devices.

The device 100 may function as a mobile or wireless device and may communicate via one or more wireless communication links through a wireless network that are based on or otherwise support any suitable wireless communication technology. For example, in some aspects, the device 100 may be a client or server, and may associate with a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web sites, etc.

As described above, the device 100 can be a portable electronic device (e.g., smart phone, dedicated augmented reality (AR) device, game device, or other device with AR processing and display capabilities). The device implementing the AR system described herein may be used in a variety of environments (e.g., shopping malls, streets, offices, homes or anywhere a user may use their device). Users can interface with multiple features of their device 100 in a wide variety of situations. In an AR context, a user may use their device to view a representation of the real world through the display of their device. A user may interact with their AR capable device by using their device's camera to receive real world images/video and process the images in a way that superimposes additional or alternate information onto the displayed real world images/video on the device. As a user views an AR implementation on their device, real world objects or scenes may be replaced or altered in real time on the device display. Virtual objects (e.g., text, images, video) may be inserted into the representation of a scene depicted on a device display.

According to aspects of the disclosure, a USLAM system 170 may be executed using instructions retrieved from a non-transitory computer readable medium. In one implementation, the instructions are stored in memory 164 as software 165. The instructions may be executed using one or more processors 161.

In certain embodiments, components of the USLAM system 170 may include (1) Mapping module 180, (2) Tracking module 181, and (3) the Global SLAM map data structure that is shared by the Mapping module 180 and the Tracking module 181. In addition, the USLAM system 170 may include an Image Processing module 171.

In one embodiment, the USLAM system 170 maintains a Global SLAM Map that may be implemented as a database of maps with finite and infinite features. Portions of the Global SLAM Map 166 may be buffered in memory 165. The map database may include multiple 3D maps. In certain implementations, at any given point in time, only one of the 3D maps may be active.

The Tacking module 181 processes the video stream from the camera at frame-rate and tracks both general and rotation-only camera motion with respect to the active 3D map. A unified pose estimator combines measurements of both finite and infinite 3D map features, and automatically computes either a 6DOF or a 3DOF pose. 6DOF poses determine the 3DOF rotation (aka orientation) and 3DOF position (aka translation) of the camera image with respect to the 3D map. 3DOF poses merely determine the 3DOF rotation with respect to the 3D map. In certain implementations, the Tracking module 181 also selects keyframes that are passed to the Mapping module 180. Correspondingly to the DOF count of the computed pose, these keyframes may be referred to as either 6DOF keyframes or 3DOF keyframes.

The Mapping module 180 extends and refines the Global SLAM map based on 6DOF and panorama keyframes selected by the Tracking module 181. Keyframes may be selected using parallax and coverage heuristics. Parallax is the angle between the viewing directions of two camera frames (e.g. between the current frame and an existing keyframe) onto the commonly viewed scene geometry (aka the finite 3D map features). Coverage is the frame area ratio that is covered with finite feature projections.

The Mapping module 180 may include 6DOF SLAM module 173, Panoramic SLAM module 175 and Mapping Mode Switching module 179. Both 6DOF SLAM module 173 and Panoromic SLAM module 175 can access and update the Global SLAM Map 166 stored in memory 164.

In some embodiments, the 6DOF SLAM Module 173 can produce keyframes with finite features from captured images. 6DOF SLAM Module 173 may produce the keyframe upon determining that a captured image meets a threshold translation from previous keyframes already associated with the Global SLAM Map. As discussed above, the 6DOF SLAM module 173 may generate maps that may contain 3D feature points triangulated from two or more keyframes (e.g., a keyframe pair, or more than a pair of keyframes) and insert the map in the Global SLAM map 165.

In certain other embodiments, Panoramic SLAM module 175 creates a panoramic map with infinite features. In certain other embodiments, Panoramic SLAM module 175 may also stitch together multiple captured images into a cohesive collection of images taken with rotation-only camera motion. USLAM system 170 using 3DOF SLAM (e.g., rotational tracking by the Panoramic SLAM module 175) may calculate three rotational degrees of freedom (3DOF) compared to the 6DOF of the 6DOF SLAM (i.e., calculated by the 6DOF SLAM module 173). The Panoramic SLAM module 175 may relate rotational keyframes to each other using relative rotations. USLAM system 170 may bypass or skip feature point triangulation when a minimum threshold parallax or translation is not met. For example, when the position of the camera has not changed and only pure rotation has occurred since previous keyframes, since the minimum threshold parallax or translation will not be met.

Certain aspects of the disclosure describe techniques for monocular VSLAM based on detecting a translational motion in the movement of the camera while operating in panoramic SLAM mode. The translation motion may be calculated using rotational motion from motion sensors 111. Motion sensors 111 may include inertial sensors, such as accelerometer, gyroscope, etc. and magnetic sensors, such as magnetometer etc. Furthermore, motion sensors may also include camera sensors and associated hardware and/or software logic for determining motion. Based on detecting translational motion while performing panoramic SLAM, a new 3D map consisting of 6DOF keyframes and finite map features may be initialized, resulting in a switch to 6DOF SLAM and continuous tracking of the camera with respect to the new 3D map.

According to certain embodiments, the detection of the translational motion is performed by the Mapping Mode Switching module 179. The detection of the translational motion between two camera views may be performed by comparing the rotational angle acquired using image processing techniques and sensors. The rotational angle detected using image processing, also referred to as vision-based rotational motion angle, may include a virtual angle component introduced due to the translational motion. On the other hand, the rotational angle from the sensors, also referred to as sensor-based rotational motion angle, represents the actual rotation of the device between the two camera views. The parallax angle, that is the angle between the two viewpoints introduced by the translational motion, can be calculated by comparing the vision-based rotational motion angle with the sensor-based rotational motion angle. Subsequently, the translational motion can be calculated using the parallax angle. In certain aspects, translational motion (indicated by the parallax angle) above a certain threshold may be used as an indicator to switch from panoramic SLAM mapping to 6DOF SLAM mapping.

Switching from panoramic SLAM mapping to 6DOF SLAM mapping, where translational motion is available, allows for enriching the Global SLAM map, by including depth for point features that would otherwise not have such depth information associated with them.

Figure 2:
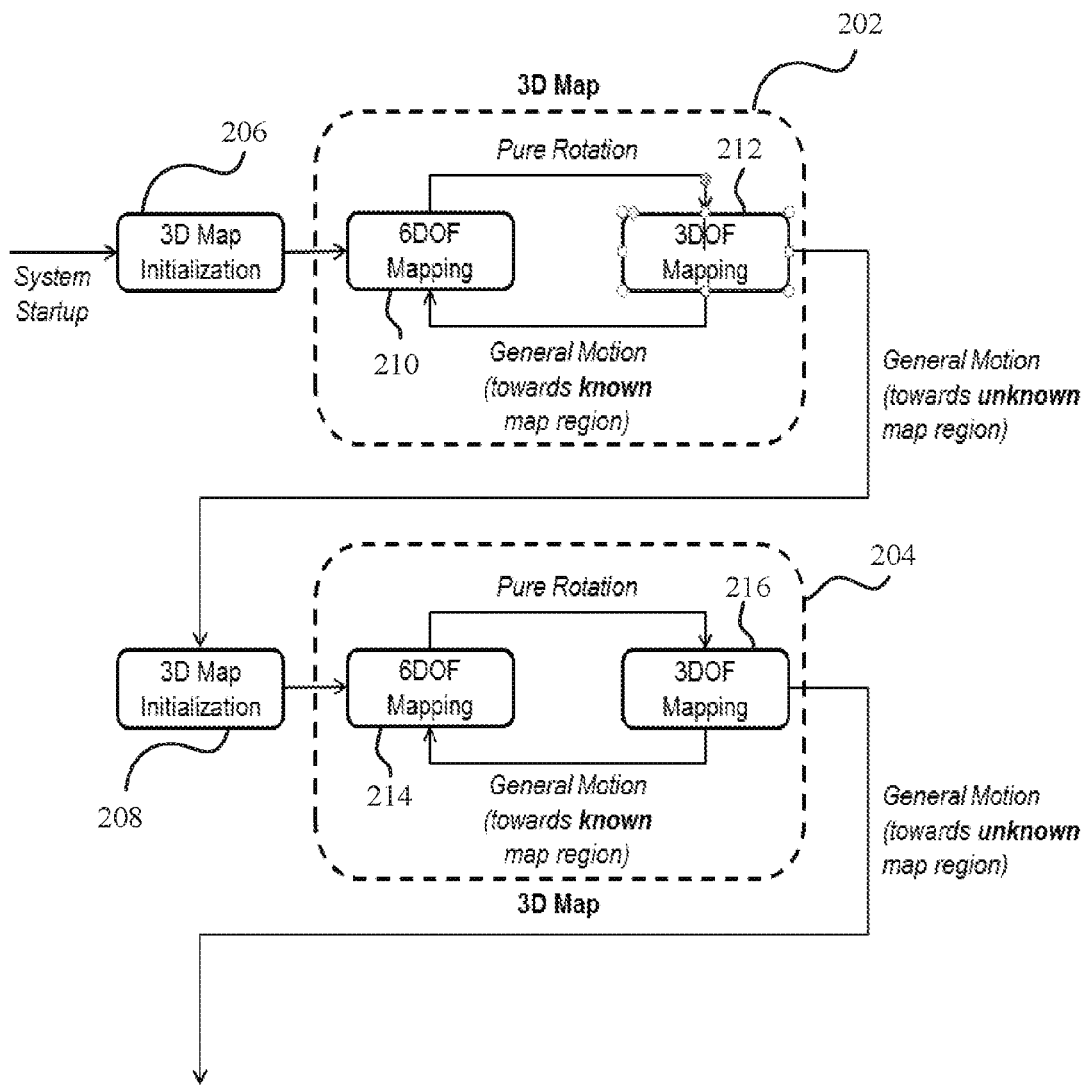
FIG. 2 illustrates a flow chart for generating maps for an example SLAM system, according to certain aspects of the disclosure.

FIG. 2 illustrates a flow chart for the unconstrained SLAM system 170, according to certain aspects of the disclosure. In FIG. 2, blocks labeled 202 and 204 represent 3D maps. Each 3D map may be treated as a container comprising multiple panoramic and general motion maps. At system startup, a first 3D map is initialized (block 106) using one or more initialization methods, such as (a) stereo initialization using at least two keyframes (user performs a translational/general camera motion), (b) detection on a known tracking target or any other suitable method.

Subsequently, different mapping modes may be executed depending on the camera motion performed by the user: Overall, 6DOF mapping 210 is executed, by the 6DOF SLAM module 173, during phases of general camera motion, and 3DOF mapping 112 is executed, by the Panoramic SLAM module 175, during phases of pure-rotation camera motion. Correspondingly, the mapping engine may:

a. Transition from 6DOF mapping 210 to 3DOF mapping 212 when pure-rotation motion is detected (using vision based methods); and b. Transition from 3DOF mapping 212 to 6DOF mapping 210 when general motion is detected (using vision based methods) and the camera moves towards known map regions (parts of the scene that are already mapped in 3D).

In certain instances, the Mapping module 180 transitions from 3DOF mapping 212 to 3D map initialization 208 when general motion is detected (using vision and motion sensors) and the camera moves towards unknown map regions (parts of the scene that are not mapped in 3D). The transition from 3DOF mapping 212 to 3D map initialization 208 is described in further detail below.

Similar to the procedure described previously with respect to blocks 206, 210 and 212, for the unknown map region 3D map initialization 208 and (6DOF and 3DOF) mapping may be performed. A new 3D map 204 is initialized and the Mapping module 180 may perform 6DOF mapping 214 for general motion and 3DOF mapping 216 for pure-rotational motion and transition between the two as long as the transitions are within the known map regions.

Figure 3:
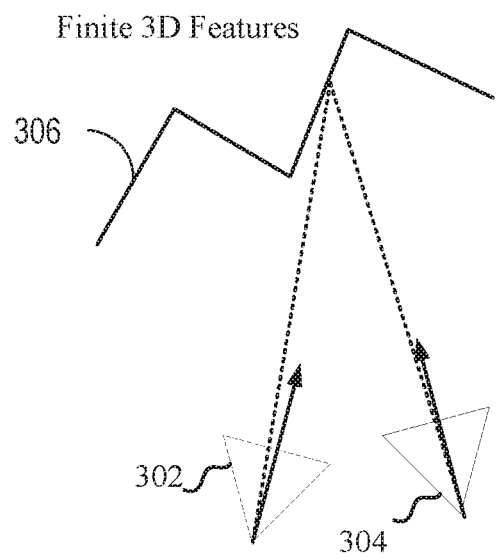
FIG. 3 illustrates a Global SLAM map representation, at time t, that includes finite 3D features, according to certain aspects of the disclosure.

FIG. 3 illustrates a Global SLAM map representation, at time t, that includes finite 3D features 306. The finite features may be detected and stored as part of a 3D map by the 6DOF SLAM module 173. Blocks 302 and 304 represent keyframes associated with different positions and orientations of a camera over time. The dotted block 302 represents a keyframe occurring in the past, at times t−1, whereas the solid lined block 304 represents the current frame at time t. FIG. 3 illustrates 6DOF mapping for general camera motion, while the camera pose is fully constrained within the 6DOF mapping. 6DOF keyframes are selected when they generate enough parallax to existing keyframes while imaging a new part of the scene. Sufficient parallax is desirable for robust feature triangulation for 6DOF mapping 110. In one embodiment, when inserting the 6DOF keyframe into the 3D map, new finite map features are added.

Figure 4:
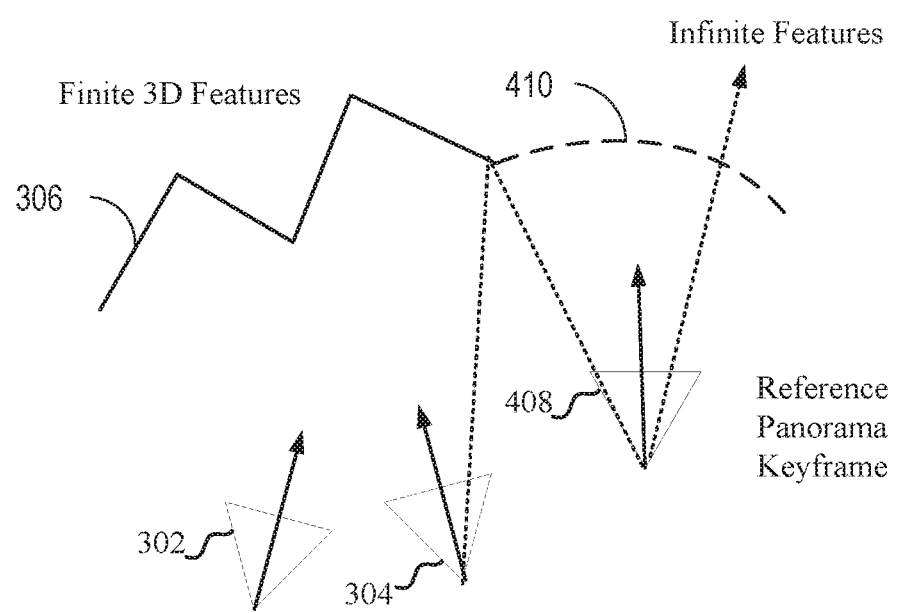
FIG. 4 illustrates a Global SLAM map representation, at time t+1, that includes finite 3D features and infinite 3D features, according to certain aspects of the disclosure.

FIG. 4 illustrates portion of the Global SLAM map representation, at time t+1, that includes finite 3D features 306 and infinite features 410, according to certain aspects of the disclosure.

Blocks 302, 304 and 408 represent keyframes associated with different positions and orientations of a camera over time. The dotted blocks 302 and 304 represent a keyframes occurring in the past at times t−1 and t, whereas the solid lined block 408 represents the current frame at time t+1. When the system detects pure rotation camera motion, a reference panorama keyframe 408 is selected that constitutes a new panorama map and defines its center of rotation. Note that the reference panorama keyframe 408 has a 6DOF pose and thus is fully localized with respect to the 3D map. Pure rotation camera motion may be detected based on the history of tracked 6DOF poses. For example, pure-rotation may be assumed if the current frame shows low parallax and a sufficient angle difference with respect to frames contained in the 6DOF frame history. In certain implementations, one or more new infinite map features may be inserted in the map as part of inserting the reference panorama keyframe.

Figure 5:
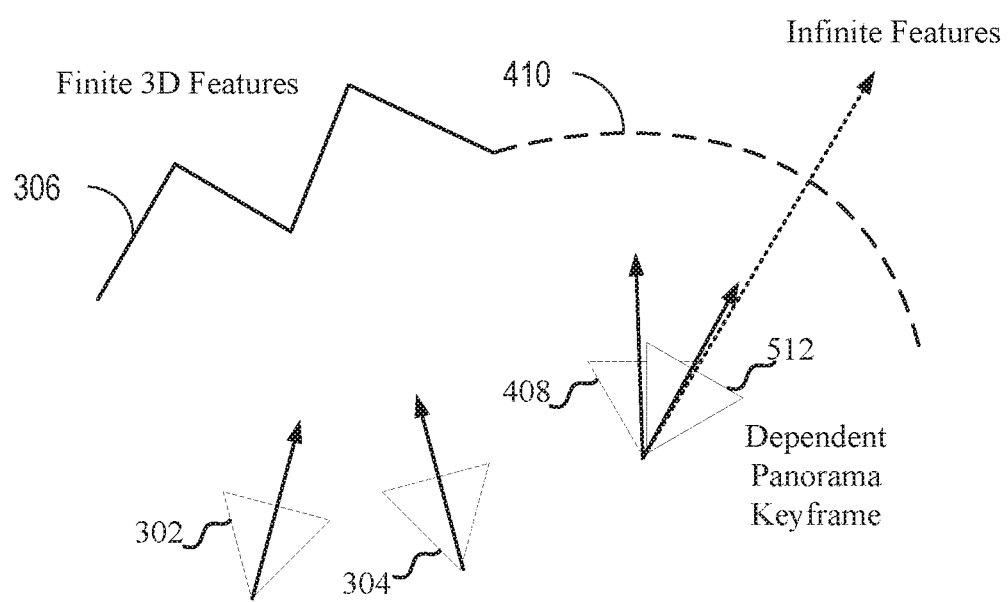
FIG. 5 illustrates a Global SLAM map representation, at time t+2, that includes finite 3D features and infinite 3D features, according to certain aspects of the disclosure.

FIG. 5 illustrates portion of the Global SLAM map representation, at time t+2, that includes finite 3D features 306 and infinite features 410, according to certain aspects of the disclosure. Blocks 302, 304, 408 and 512 represent keyframes associated with different positions and orientations of a camera over time. The dotted blocks 302, 304 and 408 represent keyframes occurring in the past at times t−1, t, and t+1, whereas the solid lined block represents the current frame 512 at time t+2.

While performing continuous pure-rotation camera motion, the Panorama module 175, continues to select dependent panorama keyframes 512 based on low coverage and sufficient rotation. Low coverage indicates that the camera continues to explore unmapped scene regions. Rotation may be computed as the difference angle between the viewing directions of the current frame and keyframe poses of the current panorama map. These keyframes are referred to as dependent keyframes, since they adopt their 3D position from the reference panorama keyframe. In certain implementations, one or more new infinite map features may be inserted in the 3D map as part of inserting the panorama keyframe.

Figure 6:
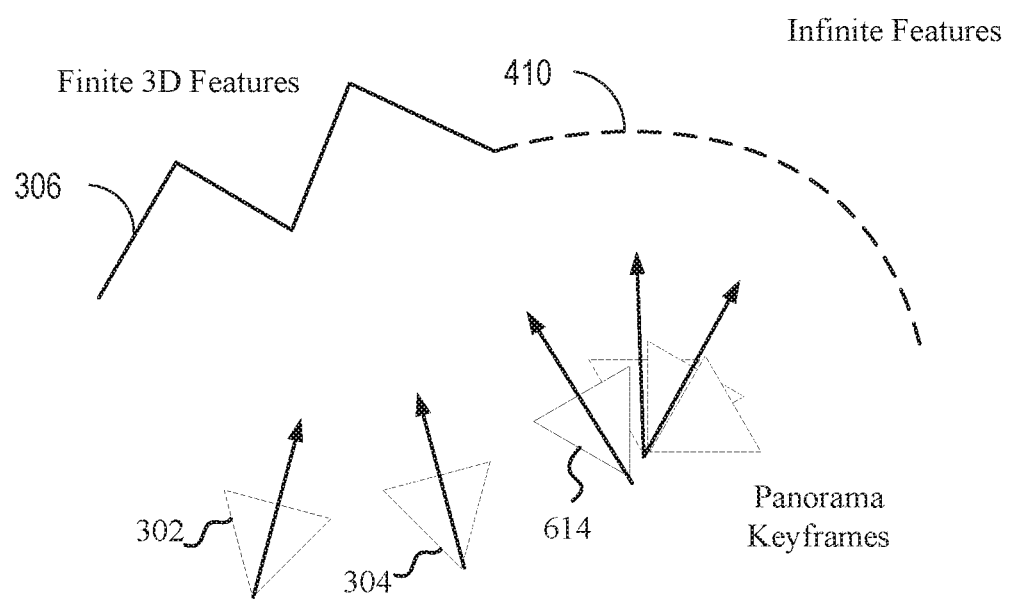
FIG. 6 illustrates a Global SLAM map representation, at time t+3, that includes finite 3D features and infinite 3D features, according to certain aspects of the disclosure.

FIG. 6 illustrates portion of the Global SLAM map representation, at time t+3, that includes finite 3D features 306 and infinite features 410, according to certain aspects of the disclosure. The dotted blocks 302, 304 and other unnumbered blocks represent keyframes occurring in the past at times t−1, t, t+1 and t+2, whereas the solid lined block represents the current frame 614 at time t+3. As shown in FIG. 6, if the camera moves away from the panorama center and back towards already known 3D map regions such that a full 6DOF pose can be estimated, the system switches to 6DOF mapping 210 from 3DOF mapping 212 for the already initiated 3D map 202 (as described with reference to FIG. 2).

Figure 7:
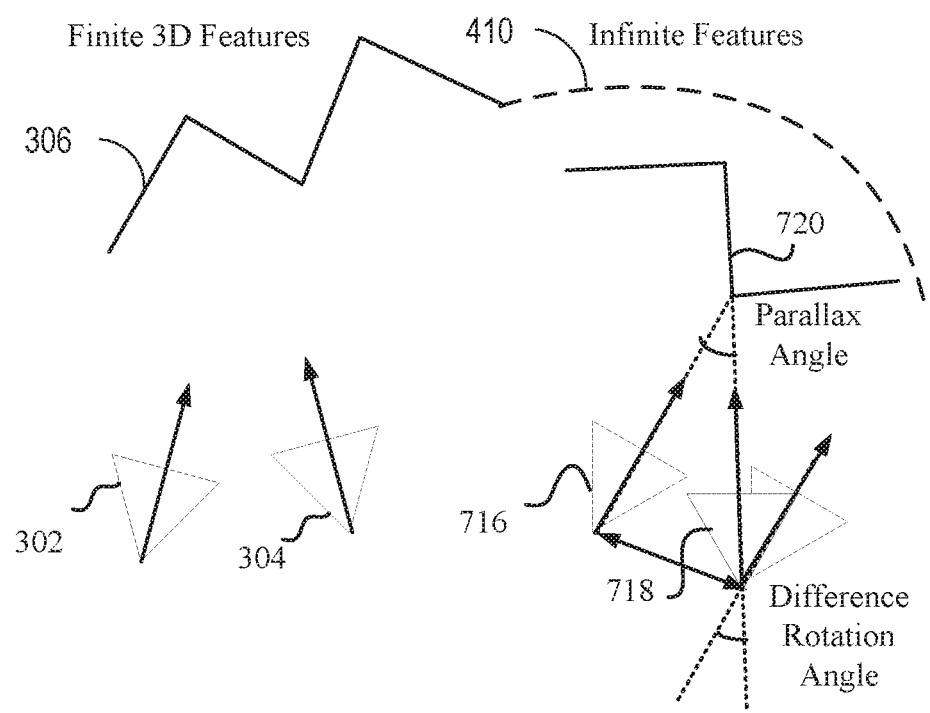
FIG. 7 illustrates a Global SLAM map representation, at time t+4, that includes finite 3D features and infinite 3D features, according to certain aspects of the disclosure.

FIG. 7 illustrates portion of the Global SLAM map representation, at time t+4, that includes finite 3D features 306 and infinite features 410, according to certain aspects of the disclosure. The dotted blocks 302, 304 and 716 represents keyframes occurring in the past at times t−1, t, t+1, t+2, and t+3, whereas the solid lined block 718 represents the current frame at time t+4. When the camera device translates away from the panorama center towards unknown scene regions, a new 3D map is initialized (block 208) as soon as two keyframes providing sufficient parallax are found.

In certain embodiments, camera translation of the device is determined by comparing two 3DOF rotations estimated independently and concurrently from vision and inertial/magnetic sensors for the motion between the reference keyframe 716 (e.g. the reference keyframe of the panorama map) and the current frame 718. The vision rotation (aka 3DOF pose) is estimated from infinite features of the panorama map. Since panorama map tracking does not allow to measure translation, the resulting rotation estimate contains virtual rotation. The sensor 3DOF rotation estimated from the motion sensors represents the real (or near-real) rotation of the device between the keyframes (716 and 718). The sensor-based rotational motion angle may be computed using a custom sensor fusion framework or may be retrieved using API calls provided by modern mobile OS platforms.

For determining camera translation, the Mapping Mode Switching module 179 may detect the difference between vision and sensor 3DOF rotation estimates for the rotation between the reference keyframe 716 and current frame 718. As determined using experiments, the resulting difference rotation angle roughly corresponds to the mean parallax angle of the image features used for the estimation of the vision rotation. Consequently, the Mapping Mode Switching module 179 may determine a convenient and configurable threshold parallax angle offset to trigger the transition from 3DOF panoramic to 6DOF general mapping and tracking. The threshold may ensure robust feature triangulation in the subsequent map initialization step.

For determining camera translation, the Mapping Mode Switching module 179 module may detect the difference between vision and sensor 3DOF rotation estimates for the rotation between the reference keyframe 716 and current frame 718. As determined using experiments, the resulting difference rotation angle roughly corresponds to the mean parallax angle of the image features used for the estimation of the vision rotation. Consequently, the Mapping Mode Switching module 179 may determine a convenient and configurable threshold parallax angle offset to trigger the transition from 3DOF panoramic to 6DOF general mapping and tracking. The threshold may ensure robust feature triangulation in the subsequent map initialization step.

Figure 8:
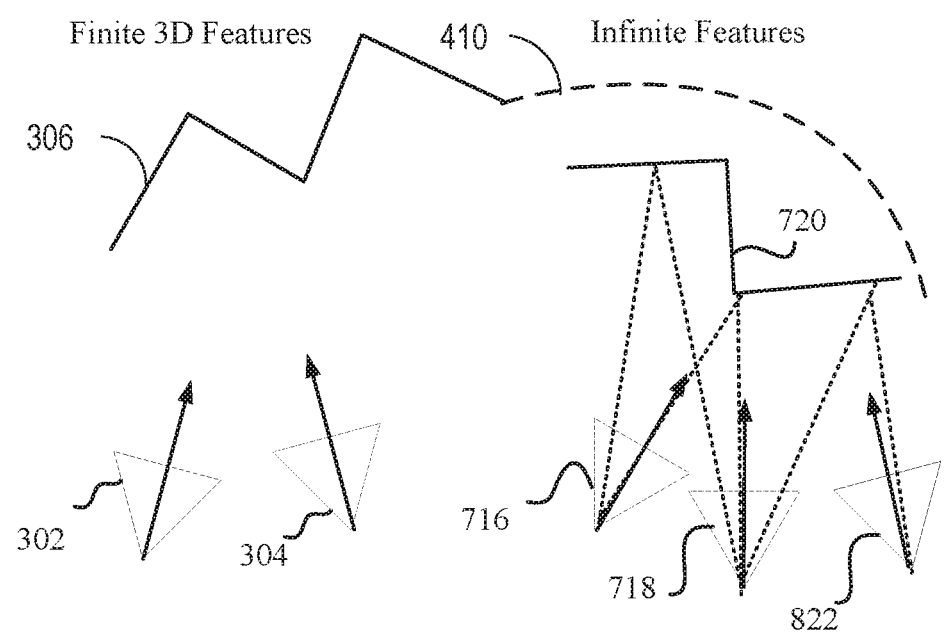
FIG. 8 illustrates a Global SLAM map representation, at time t+5, that includes finite 3D features and infinite 3D features, according to certain aspects of the disclosure.

In FIG. 8, at time t+5, a new 3D map may be initialized, as previously described with respect to block 208. Once the transition has been triggered, a new 3D map is created from the different views that allows for continuous tracking of the camera device in 6DOF. The new 3D map is initialized from a pair of keyframes (e.g. reference frame and current frame used for rotation comparison) by triangulating finite 3D features from 2D observations. For this task, any stereo initialization method (e.g. wide-baseline matching in combination with the 5-point algorithm) may be used. It is to be noted that "new" 3D map (zigzag) 720 and the "old" 3D map (zigzag) 306 may be unconnected. The spatial transformation between the two maps may be only partially known, e.g. each of the two 3D maps may have a distinct scale. The new 3D map 720 is added to the Global SLAM map and set as "active". Additional general motion, as exhibited by block 822, may be used in further refining the new 3D map 720 with finite 3D features.

Figure 9:
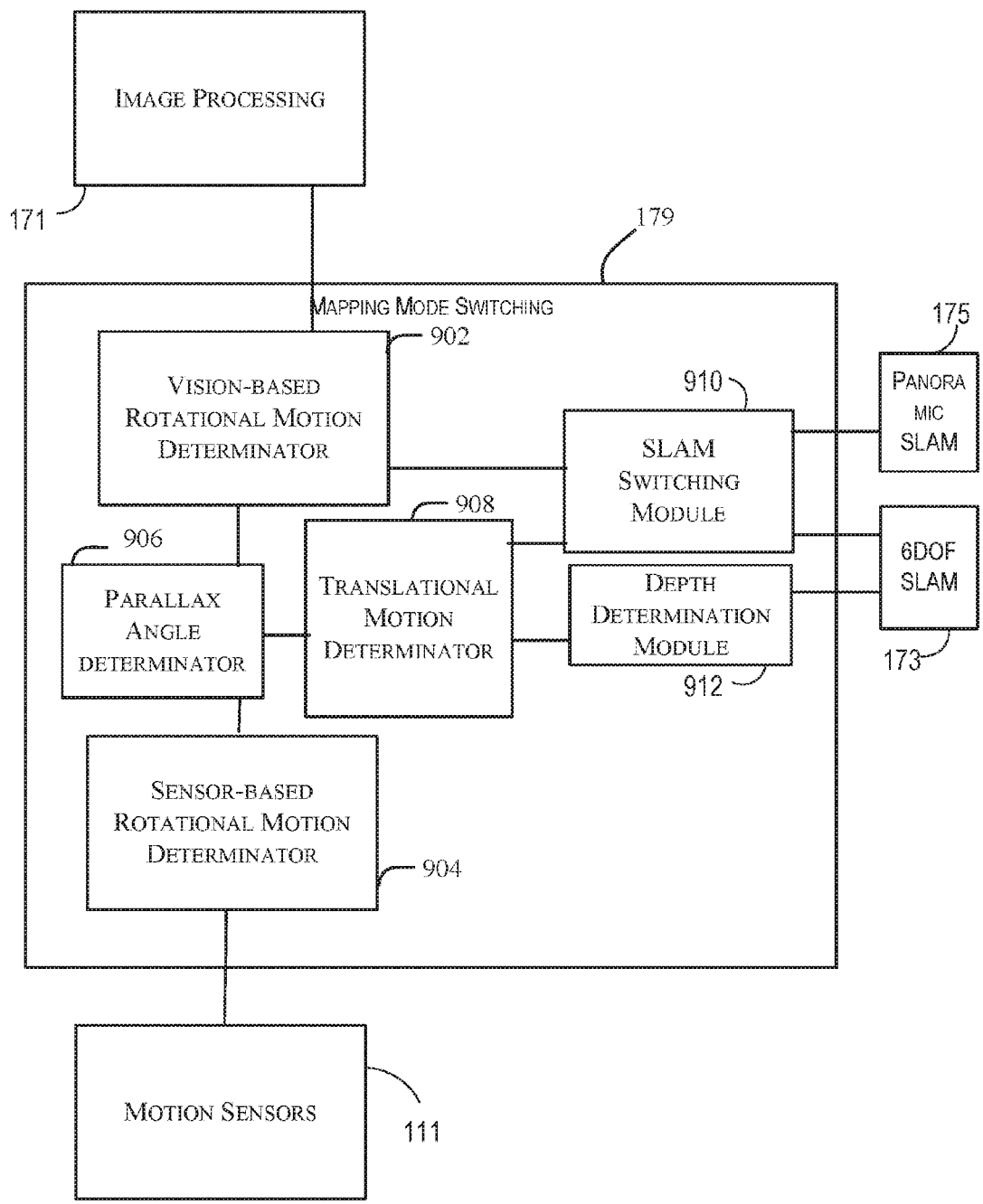
FIG. 9 is a block diagram that illustrates aspects of an example translational SLAM module, according to certain aspects of the disclosure.

FIG. 9 is a block diagram that illustrates aspects of an example translational SLAM module, according to certain aspects of the disclosure. The Mapping Mode Switching module 179 may include a Vision-Based Rotational Motion Determinator module 902, Sensor-Based Rotational Angle Determinator module 904, Parallax Angle Determinator module 906, Translational Motion Determinator module 908, SLAM Switching module 910 and Depth Determination module 912. Components of the Mapping Mode Switching module 179 may be coupled to the Image Processing module 171, Motion Sensor module 111, 3DOF SLAM module 175 and 6DOF SLAM module 173. The modules described in FIG. 9 may be combined and/or implemented using components described in FIG. 1, such as the processor 161 and/or hardware 162, based on instructions in the software 165 and the firmware 163. In certain embodiments, the software 165 or firmware 163 instructions may be stored on a non-transitory computer readable medium.

In certain implementations, while operating in rotation-only mode, the Image Processing module 171 may acquire several images or keyframes from the camera 114 for further processing. The Tracking module 181 of FIG. 1 may track the device against a panorama map using the keyframes. In addition, the Mapping module 180 may detect additional infinite features and insert these features into the 3D map.

The Vision-Based Rotational Motion Determinator 902 may receive keyframes from the Image Processing module 171 and determine the vision-based rotational motion angle for the rotation experienced by the device between two keyframes using Image Processing techniques. An additional rotational angle component, referred to as virtual angle, may be encoded as part of the vision-based rotational motion angle due to translational motion experienced by the device. In essence, while in panoramic mode the SLAM system expects only rotational-motion and calculates the vision-based rotational motion angle assuming that only rotational motion is being experienced by the device. Any translational motion is therefore erroneously encoded as part of the vision-based rotational motion. In certain instances, translational motion may be due to unintentional panning on the part of the user in panoramic SLAM mode.

In parallel, the Sensor-Based Rotational motion Determinator 904 may determine the sensor-based rotational motion angle for the same period for which the vision-based rotational motion angle is calculated. For example, if vision-based rotational motion angle is calculated for a keyframe pair (comprising a reference keyframe and current keyframe) then the sensor-based rotational motion angle is also calculated using the sensor readings for the time at which the reference keyframe and the current keyframes were acquired.

The sensor-based rotational motion angle represents the actual (or close to the actual) rotational angle for the device between the keyframes.

The Parallax Angle Determinator module 906 determines the parallax angle by comparing the sensor-based rotational motion angle and the vision-based rotational motion angle. The parallax angle, that is the angle between the two viewpoints introduced by the translational motion, also represents the difference between the baseline and scene depth. In certain embodiments, the parallax angle is compared against a threshold angle. If the parallax angle is below or equal to the threshold, the parallax angle may be ignored as noise.

If the parallax angle is above the threshold, then translational motion is determined as part of the Translational Motion Determinator module 908. The Translational Motion Determinator module 908 determines the translational motion using the parallax angle. Once the translational motion is determined, the Depth Determinator module 912 may determine depth for one or more features with respect to the device by triangulating the distance for the one or more features from the device using the translational motion. The SLAM Switching module 910 may switch the Mapping module 180 from Panoramic SLAM module 175 to 6DOF SLAM module 173. In certain instances, when the camera moves to a new region outside the active 3D map region, a new 3D map may also be initialized before switching to 6DOF SLAM 173.

Figure 10:
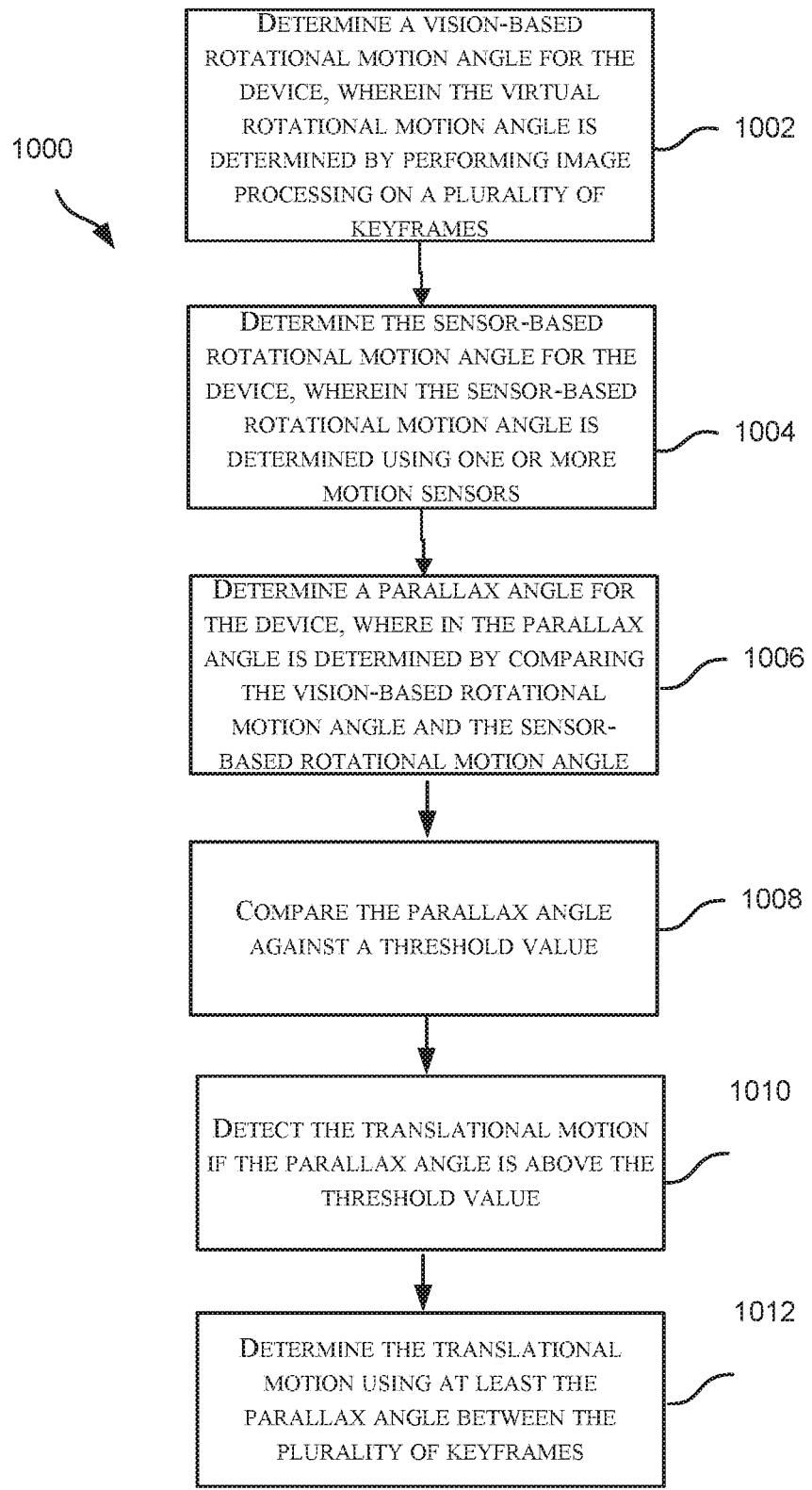
FIG. 10 illustrates a flow diagram for performing a method according to one or more aspects of the disclosure.

FIG. 10 illustrates a flow diagram for performing a method according to one or more aspects of the disclosure. According to one or more aspects, any and/or all of the methods and/or method steps described in the flow diagram 1000 illustrated in FIG. 10, may be implemented by and/or in a device 100, components of which are described in greater detail in FIG. 1, for instance. In one embodiment, one or more of the method steps described below with respect to FIG. 10 are implemented by a processor of the mobile device, such as the processor 161 or another processor. Additionally or alternatively, any and/or all of the methods and/or method steps described herein may be implemented in computer-readable instructions, such as computer-readable instructions stored on a computer-readable medium such as the memory 164 or another computer readable medium.

At block 1002, components of the device determine a vision-based rotational motion angle for the device between a plurality of keyframes, wherein the vision-based rotational motion angle is determined by performing image processing on a plurality of keyframes.

At block 1004, components of the device determine a sensor-based rotational motion angle for the device between a plurality of keyframes, wherein the sensor-based rotational motion angle is determined using one or more motion sensors coupled to the device. The one or more sensors may include inertial (gyroscope, accelerometer), magnetic (compass), and/or vision (camera) sensors built into the device.

At block 1006, components of the device determine a parallax angle for the device, wherein the parallax angle is determined by comparing the vision-based rotational motion angle with the sensor-based rotational motion angle. In certain aspects, the vision-based rotational motion angle and the sensor-based rotational motion angle are detected for a motion between a reference keyframe acquired at a first time and a current keyframe acquired at a second time.

At block 1008, components of the device compare the parallax angle against a threshold value. The threshold value may be configurable.

At block 1010, components of the device detect the translational motion if the parallax angle is above the threshold value. In certain implementations, if the parallax angle is equal to or below the threshold value the change in the parallax angle may be determined to be negligible.

At block 1012, components of the device determine the translational motion using the parallax angle. In addition, once the parallax angle is determined, aspects of the device may determine one or more features with respect to the device by triangulating the distance for the one or more features from the device using at least the translational motion.

Components of the device may further initialize a three dimensional (3D) map for tracking the device in the general motion mode, at least based on detecting of the translational motion. Components of the device may also switch to six degrees of freedom (6DOF) SLAM mapping. In one aspect, initializing a three dimensional (3D) map for tracking the device may comprise stereo initialization of the 3D map using two keyframes, at least based on detecting of the translational motion.

It should be appreciated that the specific steps illustrated in FIG. 10 provide a particular method of switching between modes of operation, according to an aspects of the present disclosure. Other sequences of steps may also be performed accordingly in alternative embodiments. For example, alternative implementations may perform the steps outlined above in a different order. To illustrate, a user may choose to change from the third mode of operation to the first mode of operation, or any combination there between. Moreover, the individual steps illustrated in FIG. 10 may include multiple substeps that may be performed in various sequences as appropriate to the individual step. Furthermore, additional steps may be added or removed depending on the particular applications. One of ordinary skill in the art would recognize and appreciate many variations, modifications, and alternatives of the process.

What is claimed is:

1. The method for detecting translational motion while tracking a device in panoramic Simultaneous Localization and Mapping (SLAM) mode, comprising:
    determining a vision-based rotational motion angle for the device, wherein the vision-based rotational motion angle is determined by performing image processing on a plurality of keyframes;
    determining a sensor-based rotational motion angle for the device between the plurality of keyframes, wherein the sensor-based rotational motion angle is determined using one or more motion sensors coupled to the device;
    determining a parallax angle for the device, wherein the parallax angle is determined by comparing the vision-based rotational motion angle and the sensor-based rotational motion angle;
    comparing the parallax angle against a threshold value; and
    detecting the translational motion based upon the parallax angle being above the threshold value.

2. The method of claim 1, further comprising determining the translational motion using at least the parallax angle between the plurality of keyframes.

3. The method of claim 2, further comprising determining depth information for one or more features with respect to the device by triangulating distance for the one or more features from the device using at least the translational motion.

4. The method of claim 1, further comprising initializing a three dimensional (3D) map for tracking the device in a general motion mode, at least based on detecting of the translational motion.

5. The method of claim 1, further comprising switching to six degrees of freedom (6DOF) SLAM mapping based on detecting the translational motion.

6. The method of claim 1, further comprising initializing a three dimensional (3D) map for tracking the device using stereo initialization of the 3D map using two keyframes, at least based on detecting of the translational motion.

7. The method of claim 1, wherein the vision-based rotational motion angle and the sensor-based rotational motion angle are detected for a motion between a reference keyframe acquired at a first time and a current keyframe acquired at a second time.

8. The method of claim 1, wherein the one or more motion sensors include one or more of a gyroscope, accelerometer, or magnetometer.

9. A device for detecting translational motion while tracking a device in panoramic Simultaneous Localization and Mapping (SLAM) mode, the device comprises:
   a memory;
   a camera coupled to the device for obtaining information about the physical scene; and
   a processor coupled to the memory and configured to:
       determine a vision-based rotational motion angle for the device, wherein the vision-based rotational motion angle is determined by performing image processing on a plurality of keyframes;
       determine a sensor-based rotational motion angle for the device between the plurality of keyframes, wherein the sensor-based rotational motion angle is determined using one or more motion sensors coupled to the device;
       determine a parallax angle for the device, wherein the parallax angle is determined by comparing the vision-based rotational motion angle and the sensor-based rotational motion angle;
       compare the parallax angle against a threshold value; and
       detect the translational motion based upon the parallax angle being above the threshold value.

10. The device of claim 9, further comprising the processor configured to determine the translational motion using at least the parallax angle between the plurality of keyframes.

11. The device of claim 10, further comprising the processor configured to determine depth information for one or more features with respect to the device by triangulating distance for one or more features from the device using at least the translational motion.

12. The device of claim 9, further comprising the processor initializing a three dimensional (3D) map for tracking the device in a general motion mode, at least based on detecting of the translational motion.

13. The device of claim 9, further comprising the processor switching to six degrees of freedom (6DOF) SLAM mapping.

14. The device of claim 9, further comprising the processor initializing a three dimensional (3D) map for tracking the device using stereo initialization of the 3D map using two keyframes, at least based on detecting of the translational motion.

15. The device of claim 9, further comprising the processor initializing a three dimensional (3D) map for tracking the device by using a known tracking target, at least based on detecting of the translational motion.

16. The device of claim 9, wherein the vision-based rotational motion angle and the sensor-based rotational motion angle are detected for a motion between a reference keyframe acquired at a first time and a current keyframe acquired at a second time.

17. The device of claim 9, wherein the one or more motion sensors include one or more of a gyroscope, accelerometer, or magnetometer.

18. A non-transitory computer-readable storage medium, wherein the non-transitory computer-readable storage medium comprises instructions executable by a processor for performing simultaneous localization and mapping (SLAM), the instructions comprising instructions to:
   determine a vision-based rotational motion angle for a device, wherein the vision-based rotational motion angle is determined by performing image processing on a plurality of keyframes;
   determine a sensor-based rotational motion angle for the device between the plurality of keyframes, wherein the sensor-based rotational motion angle is determined using one or more motion sensors coupled to the device;
   determine a parallax angle for the device, wherein the parallax angle is determined by comparing the vision-based rotational motion angle and the sensor-based rotational motion angle;
   compare the parallax angle against a threshold value; and
   detect a translational motion based upon the parallax angle being above the threshold value.

19. The non-transitory computer-readable storage medium of claim 18, further comprising determining the translational motion using at least the parallax angle between the plurality of keyframes.

20. The non-transitory computer-readable storage medium of claim 19, further comprising the processor configured to determine depth information for one or more features with respect to the device by triangulating distance for the one or more features from the device using at least the translational motion.

21. The non-transitory computer-readable storage medium of claim 18, wherein the vision-based rotational motion angle and the sensor-based rotational motion angle are detected for a motion between a reference keyframe acquired at a first time and a current keyframe acquired at a second time.

22. The non-transitory computer-readable storage medium of claim 18, wherein the one or more motion sensors include one or more of a gyroscope, accelerometer, or magnetometer.

23. An apparatus, comprising:
   means for determining a vision-based rotational motion angle for a device, wherein the vision-based rotational motion angle is determined by performing image processing on a plurality of keyframes;
   means for determining a sensor-based rotational motion angle for the device between the plurality of keyframes, wherein the sensor-based rotational motion angle is determined using one or more motion sensors coupled to the device;
   means for determining a parallax angle for the device, wherein the parallax angle is determined by comparing the vision-based rotational motion angle and the sensor-based rotational motion angle;
   means for comparing the parallax angle against a threshold value; and
   means for detecting a translational motion based upon the parallax angle being above the threshold value.

24. The apparatus of claim 23, further comprising means for determining the translational motion using at least the parallax angle between the plurality of keyframes.

25. The apparatus of claim 23, further comprising determining depth information for one or more features with respect to the device by triangulating distance for the one or more features from the device using at least the translational motion.

26. The apparatus of claim 23, wherein the vision-based rotational motion angle and the sensor-based rotational motion angle are detected for a motion between a reference keyframe acquired at a first time and a current keyframe acquired at a second time.

27. The apparatus of claim 23, wherein the one or more motion sensors include one or more of a gyroscope, accelerometer, or magnetometer.

\* \* \* \* \*